United States Patent [19]
Townsend et al.

[11] Patent Number: 5,204,054
[45] Date of Patent: Apr. 20, 1993

[54] NUCLEAR REACTOR PRESSURE VESSEL

[75] Inventors: Harold E. Townsend, Campbell; Perng-Fei Gou, Saratoga; Giancarlo Barbanti, Cupertino, all of Calif.

[73] Assignee: General Electric Company, San Jose, Calif.

[21] Appl. No.: 549,328

[22] Filed: Jul. 6, 1990

[51] Int. Cl.⁵ .................................. G21C 13/00
[52] U.S. Cl. .................................. 376/296; 376/272; 376/273; 376/461
[58] Field of Search ............ 376/296, 295, 294, 293, 376/461, 285, 272, 273

[56] References Cited

U.S. PATENT DOCUMENTS

| | | | |
|---|---|---|---|
| 3,398,493 | 8/1968 | Massey | 376/296 |
| 3,710,857 | 1/1973 | Meyer et al. | 376/294 |
| 3,834,452 | 9/1974 | Costes | 376/296 |
| 4,123,325 | 10/1978 | Ichiki et al. | 376/293 |
| 4,180,951 | 1/1980 | Francioni | 376/295 |
| 4,297,167 | 10/1981 | Schabert | 376/273 |
| 4,333,514 | 6/1982 | Dorling et al. | 376/461 |
| 4,479,336 | 10/1984 | Schoening et al. | 376/295 |
| 4,743,424 | 5/1988 | Elter et al. | 376/296 |
| 4,744,941 | 5/1988 | Bacher et al. | 376/461 |

FOREIGN PATENT DOCUMENTS 2510666 9/1976 Fed. Rep. of Germany ...... 376/294

Primary Examiner—Daniel D. Wasil
Attorney, Agent, or Firm—Robert R. Schroeder

[57] ABSTRACT

A nuclear reactor system pressure vessel comprises a steel inner liner part, an intermediate insulative layer part and an outer pre-stressed concrete part encasing these parts. Use of the pre-stressed construction allows for construction of pressure vessels of larger size than heretofore, and this coupled with utilization of squatter reactor cores allows natural convective circulation in the reactor vessel of the heated water pool in the higher capacity systems currently being introduced. The reactor pressure vessel because of its suitability allows enhanced natural steam separation in the vessel and eliminates need for use of centrifugal steam separators. The outer vessel part can be a cast single piece structure or it can be an integrated concrete segment assembled structure embodying pre-stressing tendons arranged in various orientations to effect pre-stressing. Further, the major portion of the pressure vessel can be disclosed below grade to lessen the presence of vessel structure in a nuclear system containment. Cooling passages are provided in the pressure vessel to carry off reactor decay heat as well as heat in the concrete outer vessel part.

23 Claims, 3 Drawing Sheets

NUCLEAR REACTOR PRESSURE VESSEL

BACKGROUND OF THE INVENTION

The present invention relates to nuclear reactor systems and refers more particularly to a nuclear reactor pressure vessel for use in large size water reactor systems, more particularly to such systems as represent size and capacity ratings not readily possible when employing reactor pressure vessel types as heretofore commonly used.

The evolution of nuclear reactor systems of the water reactor type has led to development of such systems in the 1000 megawatt plus range and utilization of reactor pressure vessels wherein operating pressure is about 1000 p.s.i. These reactor vessels have reached an internal diameter of about 7 meters. Manufacture of vessels of this size involves special fabrication requirements not easily met and especially since fabricators capable of fulfilling such manufacturing task are few. Also with a practical steel vessel diameter limitation of about 7 meters, there still is presented the problem of finding available surface space on a vessel to effect pass through of the many devices and appurtenant components which must be fixed on the vessel, such components including, inter alia, reactor core control rods, piping, instrumentation, cooling lines etc. This surface space requirement has led to penetration of the vessel on two or more sides, e.g., head and wall and at numbers of points. Because of this, the entire pressure vessel must be placed within a containment structure. In any event and even though the drawbacks attending limited pressure vessel size have to an extent been mitigated, the result is nonetheless, a maze of closely coupled and arranged structure having the attribute of undesirable complexity especially since larger available space and structure to accept essential components leads to more optimized installations. And not the least shortcoming of present reactor vessel designs is the inherent limitation such present to increasing system capacity.

Accordingly, it is believed a new approach to reactor pressure vessel sizing and construction which will allow tandem progress with other system enhancements is desirable and indeed, essential.

OBJECTS AND SUMMARY OF THE INVENTION

Accordingly, it is an object of the invention to provide a nuclear reactor system pressure vessel which overcomes the drawbacks of the prior art.

It is a further object of the invention to provide a nuclear reactor pressure vessel which can be made of larger size than heretofore possible and which thus allows increased system capacities as well.

It is a still further object of the invention to provide a nuclear reactor pressure vessel which is designed such that only a minimum part thereof need be housed in a containment, whereas, its remainder structure can be situated below grade directly under the containment erected on the grade expanse.

Briefly stated, there is provided a nuclear reactor system pressure vessel comprising a steel inner liner part, an intermediate insulative layer part and an outer pre-stressed concrete part encasing these parts. The pre-stressed concrete construction allows for construction of pressure vessels of larger size than heretofore, and this coupled with utilization of squatter reactor cores allows natural convective circulation of the heated water pool in the reactor pressure vessel in the higher capacity systems currently being introduced. The reactor pressure vessel because of its suitability, allows enhanced natural steam separation in the vessel and eliminates need for use of centrifugal steam separators. The outer vessel part can be a cast single-piece structure or it can be an integrated concrete segment-assembled structure embodying pre-stressing tendons arranged in various orientations to effect pre-stressing. The major portion of the pressure vessel can be disposed below grade to lessen the presence of vessel structure in a nuclear system containment. Cooling passages are provided in the vessel to carry off heat from the vessel concrete outer part as well as decay heat from the reactor core.

In accordance with these and other objects of the invention, there is provided in a nuclear reactor system which includes structure defining a containment space, said structure including a structure floor at a topographical grade level, and a nuclear reactor core, a nuclear reactor pressure vessel for housing said reactor core therein, said pressure vessel comprising a relatively widened and deepened metallic structured inner liner part, said inner liner part having a reduced width top region demarked in upward termination thereof by an inner liner part head, said inner liner part defining a fully enclosed space, said reactor core being situated in said enclosed space at a lower region therein adjacent a bottom boundary of said inner liner part, a pre-stressed concrete outer vessel part closely encasing said inner liner part in following contour therewith from the bottom boundary thereof upwardly to a location proximal merger of the inner liner part reduced region with its relatively widened remainder structure, a relatively thickened concrete cover set on top of said outer vessel part, said cover having a central opening for upward pass through of the inner liner part reduced width top region but with a surface of the cover defining the opening being arranged in close fitting abutment with an external surface of said top region.

In accordance with other aspects of the invention, at least the cover and vessel structure therebelow is disposed below grade level with the vessel advantageously supported on a buried base mat, connection between the base mat and vessel being via seismic isolators sitting on the base mat and serving to cradle the vessel.

The vessel structure (other than the cover) can be a unitary single-piece cast structure, or it can comprise pre-stressed interfitting plural vessel segments conjointly definitive of the outer vessel part structure. In either form, means are embodied in the outer vessel part for pre-stressing same and in at least any one or both of axial and circumferential directions. This means can include passages in the vessel outer part (and the cover too) which follow the axial and circumferential directions, there being elongated tendon members passing through such passages to beyond said passages, said terminations including tendon tensioning members thereon cooperative with outer vessel part surfaces adjacent passage termini for inducing compressive stress condition in said outer vessel part structure responsive to inducement of tensile stress in said tendons. The outer vessel part and cover passages can be fitted with tubular members in which said tendons are received.

The inner liner and outer vessel parts can be spaced, with the space therebetween being constituted of an insulative material layer such as a concrete layer, and the interface of the insulative layer with the inner liner part and that of such insulative layer interfacing the outer vessel part, having cooling channels formed therein for the respective carry off of decay heat and heat from the outer vessel concrete, the channels being connected with a suitable source of a cooling medium.

A circulation shroud encircles the nuclear reactor core member and extends a distance above such core member but below a normal water level in said pressure vessel. This shroud closely spaced from the core member promotes natural convective flow of heated water in the pressure vessel in a loop circuit that brings the flow upwardly within the shroud and outwardly and downwardly at its outside through spent fuel stocks stored in the vessel with return flow circuit access to the shroud interior being through openings in the bottom of the shroud. Enhanced convective flow also is requite in respect of the steam generation process. This natural convective flow is made possible since the reactor pressure vessel can have diameters considerably larger than prior types with the result that taller reactor cores are dispensed with in favor of the squatter, wider reactor cores, with which natural convective circulation is promoted.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

The present invention deals with a new nuclear reactor system pressure vessel that drastically departs from prior type pressure vessels in respect of the capacity and size of nuclear systems with which it can be used. It allows vessel sizes not generally thought to be in the realm of steel vessels and thus matches with vessel character and suitability the other improvements in nuclear reactor systems of the boiling water reactor type which presage system megawatt capacities in the plus 1350 megawatt range.

Figure 1:
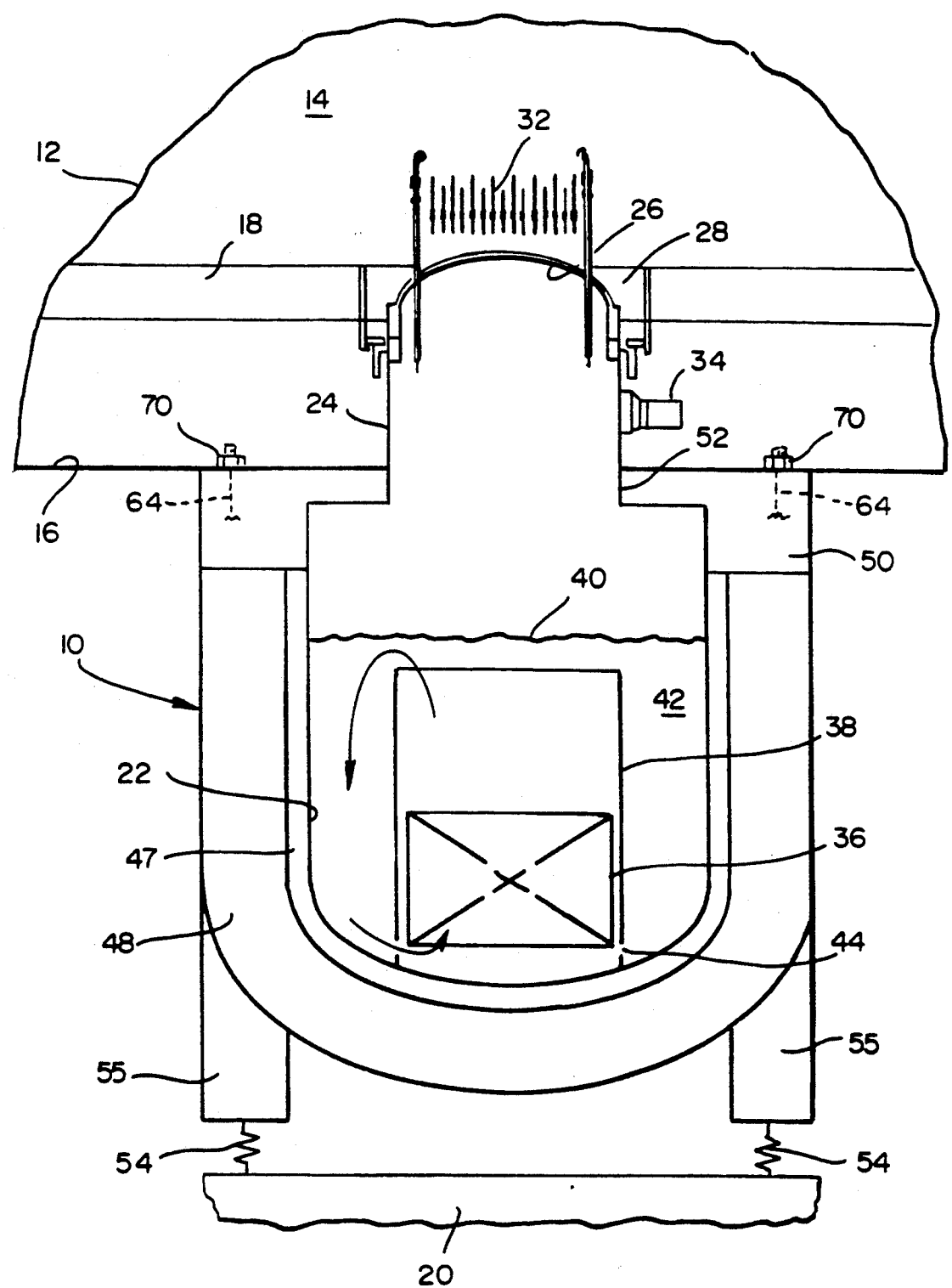
FIG. 1 is a schematic depiction in elevation of a nuclear reactor pressure vessel constructed in accordance with the principles of the invention, a portion only of the containment structure and the below grade environment where the vessel is situated being shown.

Referring to FIG. 1, there is shown a nuclear reactor pressure vessel 10 constructed in accordance with the invention. Those skilled in the art will recognize that the vessel is surmounted by a structure envelope shown generally at 12 which encloses a containment space 14, such space being like those depicted in pending, commonly-assigned application serial Nos. 07/325,729 and 07/350,189. This containment space includes, inter alia, a floor at grade level 16 and an elevated horizontal barrier floor element 18 above which exists the containment space proper.

Beneath grade 16 it will be seen is present topographical or man-made fill descending to natural earth fill presence whereat a nuclear installation can be made. A concrete base mat 20 can be provided at sub-grade level for purpose as will appear.

Pressure vessel 10 includes an inner, steel liner part 22, widened laterally at its lower, major body part and having a reduced width top section as at 24, the latter section extending upwardly to a termination demarked by a convex dished head 26, the head disposing a distance above the grade level and locating in an opening 28 in elevated barrier floor 18 of the containment structure which communicates with containment space 14. Passing through the head 26 are various components such as core reactor control rods 32, these as well as other vessel pass through appurtenances being clustered such that the only vessel pass through which need exist can be confined to the head as compared to prior vessels where space demand obliged pass through of adjacent sides to the head, the only side pass through present in the vessel 10 being main steam fitting 34 and feed water line (not shown).

Inner liner part 22 defines a fully enclosed space and reactor core 36 containing reactive fuel is disposed at the bottom of its space as depicted. Inner liner part 22, and the after described intermediate and outer vessel parts are of circular plan outline, the bottoms of all these parts being convexly dished as is common in pressure vessels. Within inner liner part 22 and encircling the reactor core, is a cylindrical shroud 38, the shroud being closely spaced with the exterior of the reactor core but being of some greater height than the relatively squat latter component. The shroud extends upwardly to just below a normal water level 40 in the inner vessel. With close spacing between the shroud and reactor core, and because the pressure vessel is relatively wide allowing low, squat core configuration, natural convective flow circulation of heated water ensues during reactor operation dispensing with need for centrifugal steam separator use in the vessel, this condition being attended by enhanced steam separation from the water pool 42.

The convective flow path courses from within the shroud at the core in the space between the two, upwardly over the shroud, laterally outwardly therefrom where cooler water is pulled down between the inner liner inner surface and the shroud exterior, this cooler water passing into the shroud interior via openings 44 for heating by the core.

An intermediate insulative layer 47 of suitable insulative material, e.g., concrete adjoins the outer surface of the inner liner, and this in turn is encased by outer pressure vessel part 48, both these last-two mentioned elements following closely the contour or geometry of the inner liner part from the bottom boundary of the inner liner part up to proximatelly but slightly below the location where the inner liner part necks in to define its reduced width top region.

A concrete cover 50 sits on top of the outer vessel part as shown and it includes a central opening where the inner liner part passes up therethrough as at 52, the cover surface defining this opening being in close abutting contact with the external surface of the inner liner part top section 24. As will be appreciated, both the outer vessel part and the cover 50 are massive and provided so to assume the purpose of withstanding expected reactor system operating pressures and to contain the water pool in the unlikely event of a rupture or shell failure in the inner liner part. Because the pressure vessel is so massive and to protect same from seismic occurrence effect, the underpart of the vessel can be mounted on concrete base mat 20 by the intermediary of seismic isolators 54, these in turn cradling downwardly depending piers 55 at the vessel underside. Base mat 20 conveniently will be provided as a concrete box structure with an open channel to provide under vessel access to the vessel tendon termini and associated fittings for maintenance purposes etc.

The outer vessel part and the cover thereof are pre-stressed concrete components. The outer vessel part can be made as a unitary cast, single-piece structure, or and because of the masses involved and the facility it offers for fabrication, it can be made of a plurality of interfitting pre-stressed concrete segments. In either case, the pre-stressing means employed are the same as will be discussed next.

Figure 2:
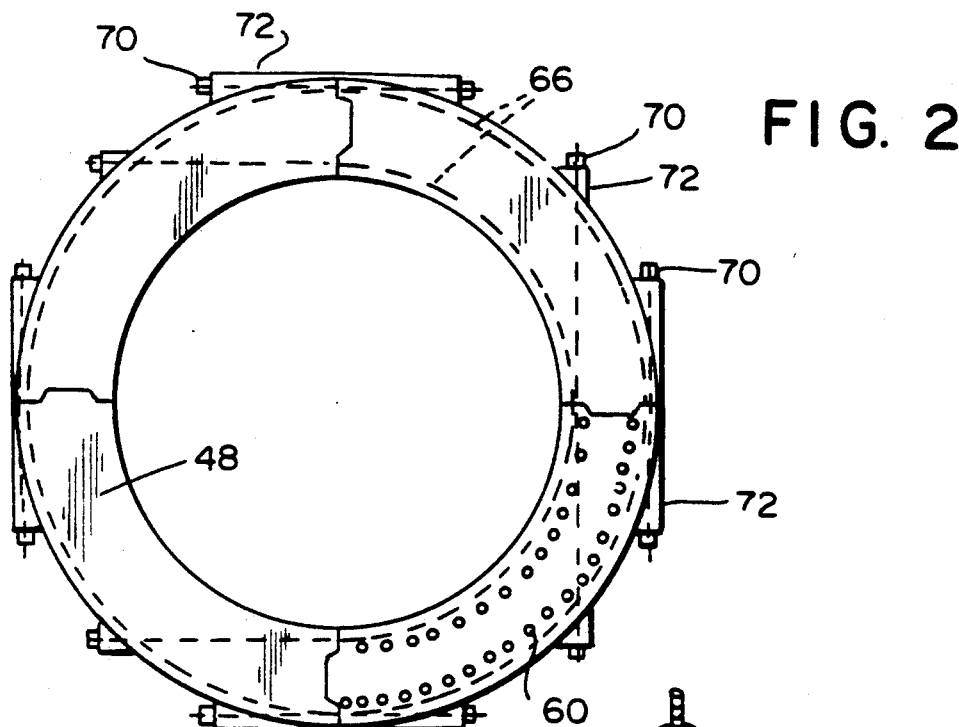
FIG. 2 is a top plan depiction of the pre-stressed concrete outer pressure vessel part, and illustrates the interlocking character of the respective ones of preformed concrete sections with which the outer vessel part can be erected, there further being shown the various axially and circumferentially directed steel tendons employed in the structure.
Figure 3:
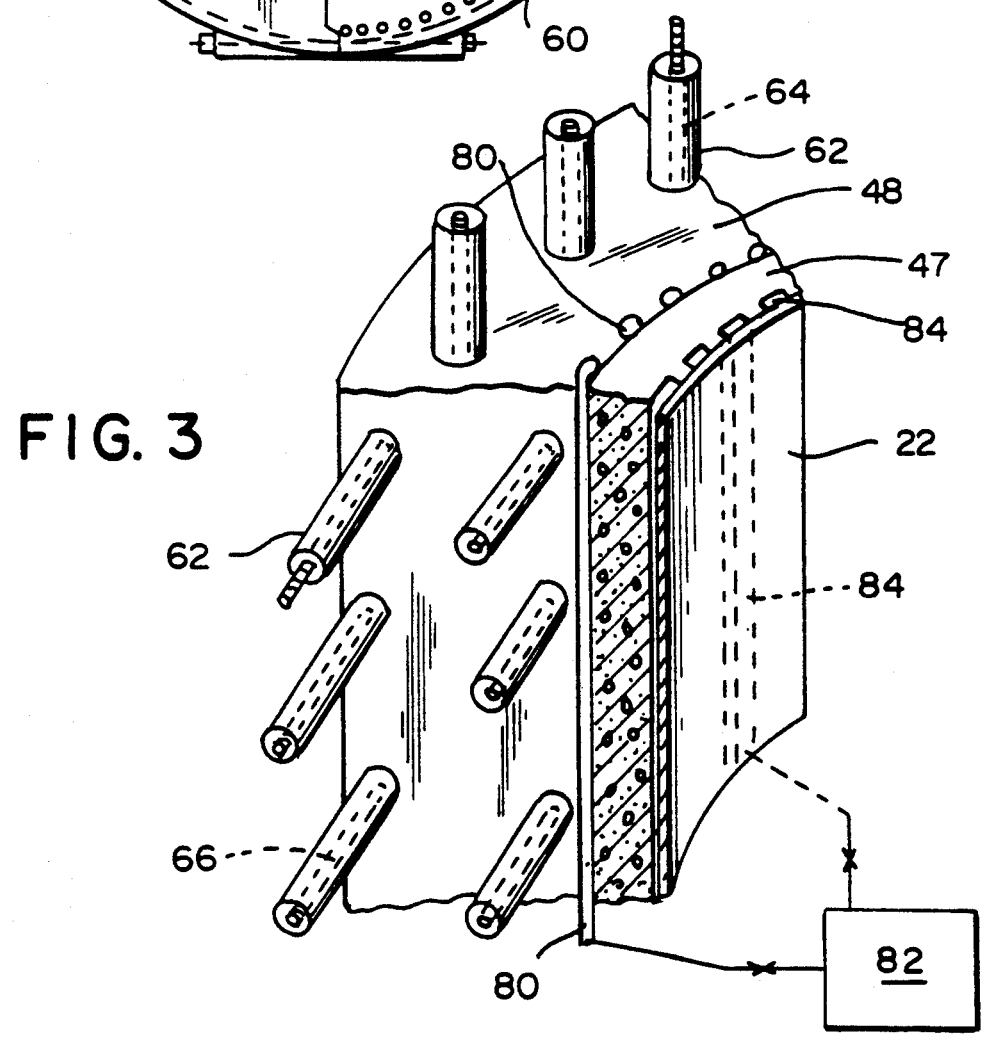
FIG. 3 is a fragmentary perspective view of a section of the pressure vessel illustrating the coursing of the pre-stressing tendons therethrough as well as depicting arrangement of decay heat carry off and concrete cooling fluid flow channels in the vessel structure.

With reference to FIGS. 2 and 3, pre-stressing of the outer vessel part (and cover 50 as well) involves formation of passages 60 in any one or both of axial and circumferential directions in the concrete of that vessel part. These passages preferably are defined by tubular members 62 set in place at the time the concrete is poured. The tubular members thus serve to receive axial and circumferential tendons respectively designated as elements 64 and 66 in FIGS. 2 and 3. These tendons extend beyond the termini of their associated passages and at least the extensions are threaded for reception of companion threaded members (nuts 70) with which tensing of the tendons can be effected. Further companion fittings 72 are employed, these being components conformably engageable with external surface areas on the outer vessel part and each being slipped on a tendon end run length so that when the nuts are taken up, the fittings 72 apply compressive stress loading to the outer vessel part structure in the various loading directions following the tendon orientations. Cover 50 it will be seen is secured to the outer vessel part with nuts and tendons 64 as shown in FIG. 1. Corollary to the compression loading of the concrete is the tensile stressing of the tendons. Loading of the concrete can, e.g., be on the order of compressive yield strength of about 3000 p.s.i. Tendon tensile pre-loading can be to about one-half the yield strength of the steel tensile members.

As best seen in FIG. 3, cooling of the pressure vessel can be provided for in the manner now described. Cooling passages 80 can be formed at the interface of the outer vessel part with the insulative layer and these passages in turn connected with a source of cooling fluid 82 so that thermal loading in the outer vessel part can be carried off and desired temperature in that structure maintained. In like manner, cooling passages 84 can be provided at the interface of the inner vessel part and the insulative layer so that cooling liquid from source 82 or another source can be supplied thereto in the event of accident or reactor isolation and decay heat from the reactor core carried off. Normally though, passages 84 will be dry.

Figure 4:
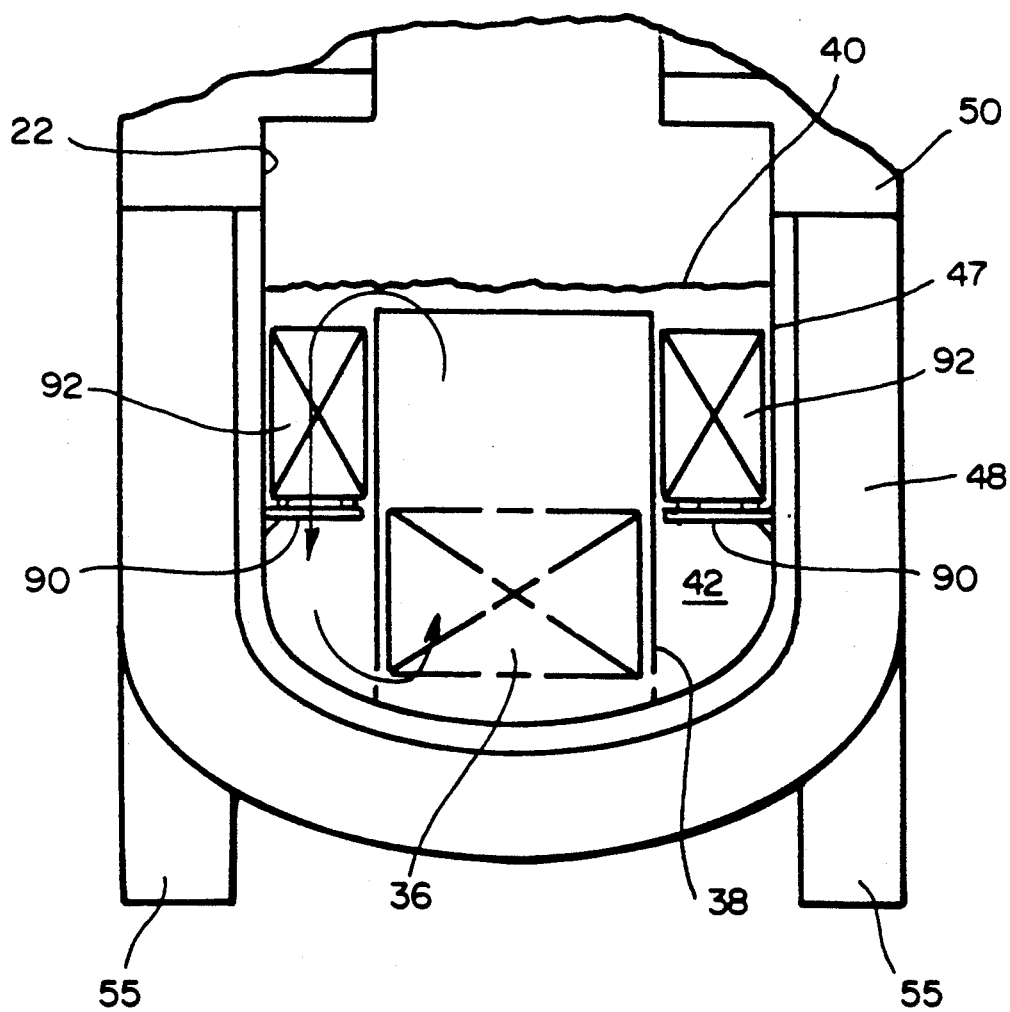
FIG. 4 is a schematic fragmentary elevational view of the pressure vessel illustrating provision within the vessel of storage racks on which spent reactor fuel can be stored temporarily and until same can be transferred directly to a dry storage facility.

Use of a greatly enlarged size reactor pressure vessel adds a further advantage to the system in that and as shown in FIG. 4, space radially outwardly of the reactor core is present for inclusion of support members 90 on which containers 92 holding spent nuclear fuel can be stored submerged in the pool 42 for a length of time up to about 5 years at which point these containers can be transferred to a dry storage facility, thereby eliminating need for erection and employment of any separate spent fuel pools.

The advance in reactor pressure vessel size offered by the invention can be appreciated by reference to the fact that prior boiling water reactor vessels generally are limited to vessel inner diameters of about 7 meters. With the vessel of the invention these diameters can be increased to a range of about 10 to about 15 meters. Incident this size increase is the ability to cut down reactor core heights to values which promote natural convective water circulation, e.g., use of cores only 9 feet high since lateral dimension thereof can be increased at no expense to convective flow characteristics.

In a representative installation, the outer vessel part can have a wall thickness of 3 meters or more, and the steel inner liner wall thickness (inclusive of the thickness of an adjoining insulative layer) can be about one-half meter.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a nuclear reactor system including structure defining a containment space, said structure including a structure floor at a topographical grade level, and a nuclear reactor core, a pressure vessel for housing said reactor core therein, said pressure vessel comprising, a metallic structured inner liner part, said inner liner part having a top region of reduced width relative to that of an inner liner lower major body part, said top region demarked in upward termination thereof by an inner liner part head, said inner liner part having an encircling compass and defining a fully enclosed space, said reactor core being situate in said enclosed space at a lower region therein adjacent a bottom boundary of said inner liner part, a pre-stressed concrete outer vessel part encasing said inner liner part in following contour therewith from the bottom boundary thereof upwardly to a location proximal merger of the inner liner part reduced width region with its relatively widened remainder structure, a concrete cover received on top of said outer vessel part, said cover having a central opening for upward pass through of the inner liner part reduced width top region but with a surface of the cover defining the opening in abutment with an external surface of said top region, the cover, the concrete outer vessel and the inner liner lower body major part being disposed below the grade level in an earth fill, and a circulation shroud in the pressure vessel located about the reactor core spaced therefrom and extending upwardly therefrom to a location proximal but below a normal level of a steam generating pool of water present in the vessel, the reactor core being squat comparative to a height of the pool whereby natural circulation of heated water in the pool is promoted in a convective flow path defined by the space between the shroud and the reactor core, upwardly towards a surface of the pool and then downwardly at the exterior side of the shroud to a shroud space reentry location defined by shroud openings adjacent a lower reach of the reactor core.

2. The nuclear reactor system pressure vessel of claim 1 in which a concrete base mat is buried in said earth fill and said pressure vessel is supported on said base mat.

3. The nuclear reactor system pressure vessel of claim 2 in which the pressure vessel is supported on said base mat through the intermediary presence of seismic isolators set on the base mat and cradling the pressure vessel.

4. The nuclear reactor pressure vessel of claim 1 in which the outer vessel part is a unitary cast-in-place structure.

5. The nuclear reactor pressure vessel of claim 1 in which the outer vessel part is an integrated structure comprised of plural interfitting pre-cast vessel segments.

6. The nuclear reactor pressure vessel of claim 1 comprising means embodied in said outer vessel part for pre-stressing same and including such means as effect pre-stressing in at least any one or both of axial and circumferential directions in the vessel part structure.

7. The nuclear reactor pressure vessel of claim 6 in which said pre-stressing means include passages formed in said outer vessel part in any one or both of axial and circumferential directions therein, elongated tendon members passing through said passages to terminations beyond said passages, said terminations including tendon tensioning members thereon cooperative with outer vessel part surfaces adjacent passage termini for inducing compressive stress condition in said outer vessel part structure responsive to inducement of tensile stress in said tendons.

8. The nuclear reactor pressure vessel of claim 7 further comprising hollow tubular members coursing said passages between termini thereof, said tendons being received in said tubular members.

9. The nuclear reactor pressure vessel of claim 6 in which said pre-stressing means are embodied additionally in said cover being employed in effecting secured joinder of said cover to said outer vessel part.

10. The nuclear reactor pressure vessel of claim 1 in which an outer surface of the inner liner part and an inner surface of the outer vessel part over at least an appreciable expanse of where the latter has following contour with the former, are spaced one from the other, and a layer of insulative material filling the space between said two surfaces.

11. The nuclear reactor pressure vessel of claim 10 in which the insulative material is concrete.

12. The nuclear reactor pressure vessel of claim 10 further comprising cooling passages formed in said vessel at the interface boundary of said outer vessel part and said insulative material for flowing cooling fluid from a source thereof through said cooling passages to carry off heat from said outer vessel part.

13. The nuclear reactor pressure vessel of claim 10 further comprising cooling liquid passages formed in said vessel at the interface boundary of said inner liner part and said insulative material for flowing cooling liquid from a source thereof through said cooling liquid passages to carry off decay heat from said reactor core.

14. The nuclear reactor pressure vessel of claim 1 further comprising storage support means disposed at a submerged location in said pool in said reactor vessel radially outwardly of said shroud and receptive of a spent core fuel container whereby such spent fuel indefinitely can be stored in said reactor vessel additionally to an active reactive fuel presence in said core reactor.

15. The nuclear reactor pressure vessel of claim 14 in which said convective flow path courses through said spent core fuel container.

16. The nuclear reactor pressure vessel of claim 1 in which said vessel has a plan circular profile.

17. The nuclear reactor pressure vessel of claim 16 in which the inner liner part has an internal diameter in the range about 10 to about 15 meters.

18. The nuclear reactor pressure vessel of claim 17 in which the inner liner part inner diameter is at least about 12 meters.

19. The nuclear reactor pressure vessel of claim 17 in which the outer vessel part has a thickness of about 3 meters or greater.

20. The nuclear reactor pressure vessel of claim 17 in which the inner liner top part reduced width region has an inner diameter of at least about 6.5 meters.

21. The nuclear reactor pressure vessel of claim 17 in which the reactor core has a height of about 9 feet.

22. The nuclear reactor pressure vessel of claim 17 in which said inner liner part is of steel and has, along with an adjoining insulative material layer, a thickness of about 0.5 meter.

23. The nuclear reactor pressure vessel of claim 10 in which the pre-stressed concrete is pre-stressed to a compressive yield strength of about 3000 p.s.i.

* * * * *